US009978053B1

(12) United States Patent
Zhu

(10) Patent No.: US 9,978,053 B1
(45) Date of Patent: May 22, 2018

(54) DYNAMIC PROMOTION CODE INSERTION IN CONTACTLESS PAYMENT TRANSACTION

(71) Applicant: Sprint Communications Company L.P., Overland Park, KS (US)

(72) Inventor: Kevin Zhu, Marietta, GA (US)

(73) Assignee: Sprint Communications Company L.P., Overland Park, KS (US)

( * ) Notice: Subject to any disclaimer, the term of this patent is extended or adjusted under 35 U.S.C. 154(b) by 699 days.

(21) Appl. No.: 14/564,063

(22) Filed: Dec. 8, 2014

Related U.S. Application Data

(62) Division of application No. 12/784,289, filed on May 20, 2010, now Pat. No. 8,942,992.

(51) Int. Cl.
G06Q 30/00 (2012.01)
G06Q 20/32 (2012.01)
G06Q 30/02 (2012.01)

(52) U.S. Cl.
CPC ......... G06Q 20/32 (2013.01); G06Q 30/0267 (2013.01)

(58) Field of Classification Search
None
See application file for complete search history.

(56) References Cited

U.S. PATENT DOCUMENTS

| | | | | |
|---|---|---|---|---|
| 5,710,886 A * | 1/1998 | Christensen | ......... | G06Q 20/387 705/14.26 |
| 7,257,545 B1 * | 8/2007 | Hung | ..................... | G06Q 30/02 705/14.26 |
| 7,260,399 B1 * | 8/2007 | Oh | ......................... | H04W 36/24 370/331 |
| 7,413,113 B1 * | 8/2008 | Zhu | ......................... | G06Q 20/12 235/375 |
| 7,434,723 B1 * | 10/2008 | White | .................... | G06Q 20/20 235/375 |
| 7,454,192 B1 * | 11/2008 | Zhu | ..................... | G06F 17/3087 379/114.28 |

(Continued)

OTHER PUBLICATIONS

Restriction Requirement dated Oct. 20, 2011, U.S. Appl. No. 12/784,289, filed May 20, 2010.

(Continued)

*Primary Examiner* — Matthew T Sittner

(57) ABSTRACT

A portable electronic device is provided comprising a processor, a memory, a first radio transceiver, a second radio transceiver, and an application stored in the memory that, when executed by the processor, receives a first rule associated with a first commercial promotion via the first radio transceiver. The application also determines, based on the first rule and information specific to the device, that the device is qualified to exercise a right associated with the first commercial promotion. The application also transmits to a server via the first radio transceiver a message indicating that the device has qualified to exercise the right associated with the first commercial promotion and associating a code with the first commercial promotion. The application also completes a payment transaction for one of a product or a service via the second radio transceiver, wherein the payment transaction comprises transmitting the code associated with the first commercial promotion.

18 Claims, 6 Drawing Sheets

(56) References Cited

U.S. PATENT DOCUMENTS

| | | | |
|---|---|---|---|
| 7,494,067 B1* | 2/2009 | Zhu | G06Q 20/20 235/435 |
| 7,522,904 B1* | 4/2009 | Zhu | H04L 12/2898 370/338 |
| 8,942,992 B1* | 1/2015 | Zhu | G06Q 30/0238 705/14.1 |
| 2002/0077905 A1* | 6/2002 | Arndt | G06Q 30/02 705/14.58 |
| 2002/0091567 A1* | 7/2002 | Royston | G06Q 20/208 705/14.24 |
| 2002/0091569 A1* | 7/2002 | Kitaura | G06Q 30/02 705/14.26 |
| 2002/0178069 A1* | 11/2002 | Walker | G06Q 10/0637 705/7.36 |
| 2003/0004808 A1* | 1/2003 | Elhaoussine | G06Q 20/045 705/14.27 |
| 2003/0023482 A1* | 1/2003 | Messner | G06Q 20/204 705/14.26 |
| 2003/0233276 A1* | 12/2003 | Pearlman | G06Q 20/3274 705/14.23 |
| 2004/0098339 A1* | 5/2004 | Malek | G06Q 20/00 705/44 |
| 2004/0122736 A1* | 6/2004 | Strock | G06Q 30/02 705/14.31 |
| 2004/0140361 A1* | 7/2004 | Paul | G06Q 20/341 235/462.45 |
| 2004/0158492 A1* | 8/2004 | Lopez | G06Q 30/02 705/14.38 |
| 2004/0254836 A1* | 12/2004 | Emoke Barabas | G06Q 30/02 705/14.35 |
| 2005/0071233 A1* | 3/2005 | Nemeth | G06Q 20/04 705/18 |
| 2006/0053056 A1* | 3/2006 | Alspach-Goss | G06Q 20/10 705/14.17 |
| 2006/0178932 A1* | 8/2006 | Lang | G06Q 30/02 705/14.73 |
| 2006/0287964 A1* | 12/2006 | Brown | G06Q 20/26 705/64 |
| 2007/0112633 A1* | 5/2007 | Walker | G06Q 20/20 705/21 |
| 2007/0198432 A1* | 8/2007 | Pitroda | G06Q 20/02 705/64 |
| 2007/0276727 A1* | 11/2007 | Thibedeau | G06Q 30/02 705/14.26 |
| 2008/0052169 A1* | 2/2008 | O'Shea | G06O 20/10 705/14.17 |
| 2008/0120236 A1* | 5/2008 | Faith | G06Q 20/20 705/44 |
| 2008/0154727 A1* | 6/2008 | Carlson | G06Q 30/02 705/14.38 |
| 2008/0167991 A1* | 7/2008 | Carlson | G06Q 30/02 705/50 |
| 2008/0183581 A1* | 7/2008 | Coppolani | G06Q 20/387 705/14.39 |
| 2008/0201224 A1* | 8/2008 | Owens | G06Q 20/04 705/14.14 |
| 2008/0201226 A1* | 8/2008 | Carlson | G06Q 20/387 705/14.26 |
| 2008/0207296 A1* | 8/2008 | Lutnick | G07F 17/32 463/16 |
| 2009/0063261 A1* | 3/2009 | Scribner | G06Q 30/02 705/14.69 |
| 2009/0076912 A1* | 3/2009 | Rajan | G06Q 30/02 705/14.64 |
| 2009/0106115 A1* | 4/2009 | James | G06Q 20/10 705/14.26 |
| 2009/0132362 A1* | 5/2009 | Fisher | G06Q 10/06 705/14.47 |
| 2009/0132380 A1* | 5/2009 | Tymm | G06Q 20/045 705/17 |
| 2009/0156190 A1* | 6/2009 | Fisher | G06Q 40/02 455/418 |
| 2009/0164380 A1* | 6/2009 | Brown | G06Q 20/341 705/65 |
| 2009/0171778 A1* | 7/2009 | Powell | G06Q 20/02 705/14.36 |
| 2009/0171794 A1* | 7/2009 | Hogan | G06Q 20/04 705/17 |
| 2009/0181131 A1* | 7/2009 | Forbes-Roberts | G06Q 30/0601 426/106 |
| 2009/0187507 A1* | 7/2009 | Brown | G06Q 20/341 705/66 |
| 2009/0198529 A1* | 8/2009 | Burkholder | G06Q 10/087 705/28 |
| 2009/0216579 A1* | 8/2009 | Zen | G06Q 20/12 705/14.1 |
| 2009/0292600 A1* | 11/2009 | Davis | G06Q 20/20 705/14.14 |
| 2010/0070361 A1* | 3/2010 | Hurley | G06Q 20/24 705/14.23 |
| 2010/0093333 A1* | 4/2010 | Friedenthal | G06Q 30/02 455/418 |
| 2010/0114686 A1* | 5/2010 | Carlson | G06Q 20/04 705/14.17 |
| 2010/0121766 A1* | 5/2010 | Sugaya | G06Q 30/02 705/50 |
| 2010/0131342 A1* | 5/2010 | Thibedeau | G06Q 20/202 705/14.13 |
| 2010/0131415 A1* | 5/2010 | Sartipi | G06Q 20/02 705/75 |
| 2010/0174596 A1* | 7/2010 | Gilman | G06Q 20/387 705/14.23 |
| 2010/0179872 A1* | 7/2010 | Fujita | G06Q 30/02 705/14.38 |
| 2010/0211445 A1* | 8/2010 | Bodington | G06Q 30/02 705/14.17 |
| 2011/0040602 A1* | 2/2011 | Kurani | G06Q 30/02 705/7.32 |
| 2011/0060691 A1* | 3/2011 | Grossman | G06Q 20/20 705/80 |
| 2011/0076941 A1* | 3/2011 | Taveau | G06Q 10/10 455/41.1 |
| 2011/0087529 A1* | 4/2011 | Angell | G06Q 30/02 705/14.13 |
| 2011/0145081 A1* | 6/2011 | Tomchek | G06Q 20/02 705/21 |
| 2011/0161142 A1* | 6/2011 | Dunn | G06Q 30/02 705/14.1 |
| 2011/0173053 A1* | 7/2011 | Aaltonen | G06Q 20/35785 705/14.1 |
| 2011/0191160 A1* | 8/2011 | Blackhurst | G06Q 20/20 705/14.38 |
| 2011/0191164 A1* | 8/2011 | Reichert | G06Q 30/0244 705/14.43 |
| 2011/0213657 A1* | 9/2011 | O'Malley | G06Q 30/0251 705/14.49 |
| 2011/0231236 A1* | 9/2011 | Gonzalez | G06Q 30/02 705/14.25 |
| 2011/0238476 A1* | 9/2011 | Carr | G06Q 30/00 705/14.25 |
| 2011/0238483 A1* | 9/2011 | Yoo | G06O 30/02 705/14.38 |
| 2011/0258062 A1* | 10/2011 | Hirson | G06O 20/24 705/26.1 |

OTHER PUBLICATIONS

FAIPP Pre-Interview Communication dated Dec. 13, 2011, U.S. Appl. No. 12/784,289, filed May 20, 2010.

Final Office Action dated Feb. 9, 2012, U.S. Appl. No. 12/784,289, filed May 20, 2010.

Office Action dated Apr. 14, 2014, U.S. Appl. No. 12/784,289, filed May 20, 2010.

Notice of Allowance dated May 19, 2014, U.S. Appl. No. 12/784,289, filed May 20, 2010.

* cited by examiner

DYNAMIC PROMOTION CODE INSERTION IN CONTACTLESS PAYMENT TRANSACTION

CROSS-REFERENCE TO RELATED APPLICATIONS

This application is a divisional of and claims priority under 35 U.S.C. § 120 to U.S. patent application Ser. No. 12/784,289, filed on Nov. 4, 2010, entitled, "Dynamic Promotion Code Insertion in Contactless Payment Transaction," which is incorporated herein by reference for all purposes. one.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Portable electronic devices may be used to engage in a plurality of commercial activities including the making of purchases at retail establishments. Portable electronic devices, including mobile telephones, may complete contactless transactions at point of sale terminals at many kinds of vendors of goods and services. Portable electronic devices store account data for payment methods, such as credit cards, debit cards, gift cards, access cards, and cards for various prepaid services or goods. The account information may be stored on a secure element in the portable electronic device. The information may be managed and transmitted by an electronic wallet software application that is stored and executes on the portable electronic device. Portable electronic devices also may receive commercial promotions and coupons associated with goods and services that may be purchased using the electronic wallet application and other electronic payment methods. Profiles containing information about the user may be stored on the portable electronic device.

SUMMARY

In an embodiment, a portable electronic device is provided. The portable electronic device comprises a processor, a memory, a first radio transceiver, a second radio transceiver, and an application stored in the memory that, when executed by the processor, receives a first rule associated with a first commercial promotion via the first radio transceiver. The application also determines, based on the first rule and information specific to the portable electronic device, that the portable electronic device is qualified to exercise a right associated with the first commercial promotion. The application also transmits to a server via the first radio transceiver a message indicating that the portable electronic device has qualified to exercise the right associated with the first commercial promotion and associating a code with the first commercial promotion. The application also completes a payment transaction for one of a product or a service via the second radio transceiver, wherein the payment transaction comprises transmitting the code associated with the first commercial promotion.

In an embodiment, a method of completing a contactless payment transaction is provided. The method comprises a portable electronic device transmitting a message via a mobile wireless network to an offer platform, the message associating a code with a plurality of coupons. The method also comprises the portable electronic device sending a payment message via contactless communication to a point of sale terminal, the payment message comprising information identifying a payment account and the code. The method also comprises the point of sale terminal communicating with the offer platform to retrieve information about the plurality of coupons based on the code. The method also comprises the point of sale terminal identifying at least one of the plurality of coupons that associates with the product or service being paid for by the portable electronic device. The method also comprises the point of sale terminal charging the payment account based at least in part on a discount associated with the at least one coupon that associates with the product or service paid for by the portable electronic device.

In an embodiment, a method of completing a contactless payment transaction is provided. The method comprises a portable electronic device transmitting payment account information in a track one portion of a payment transaction message and a promotion code in a track two portion of the payment transaction message to a point of sale terminal to complete a payment transaction. The method also comprises the point of sale terminal retrieving promotion information based on the promotion code and the point of sale terminal charging the payment account identified by the payment account information.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
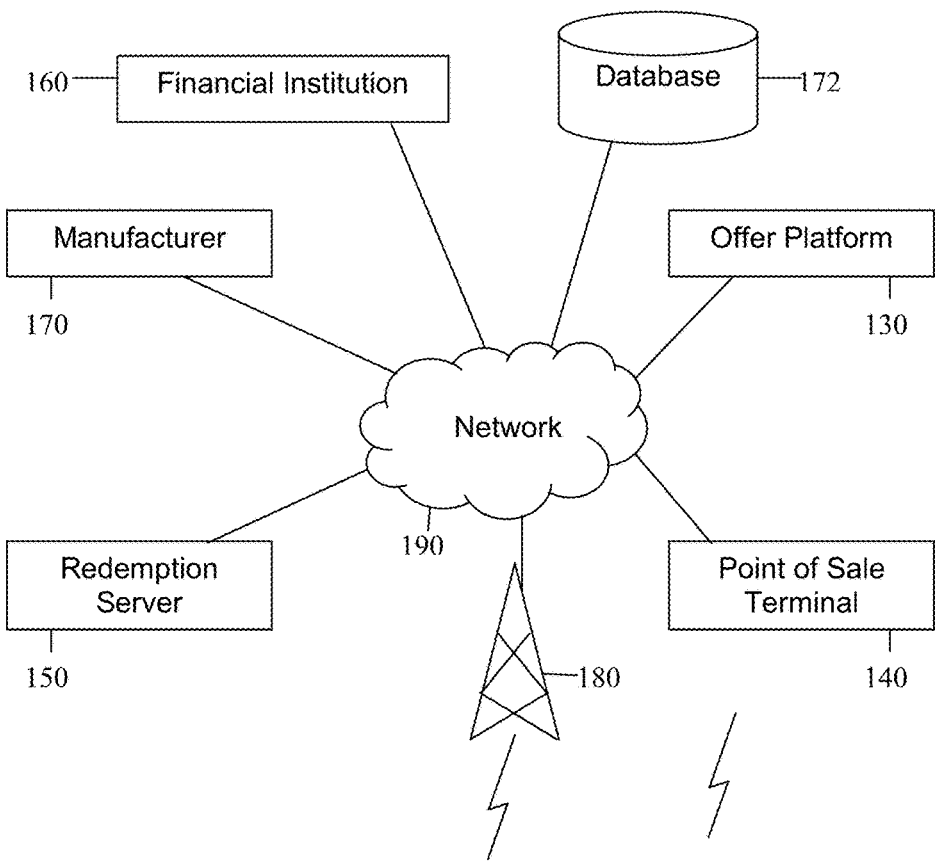
FIG. 1 is a block diagram of a system according to an embodiment of the disclosure.
Figure 1:
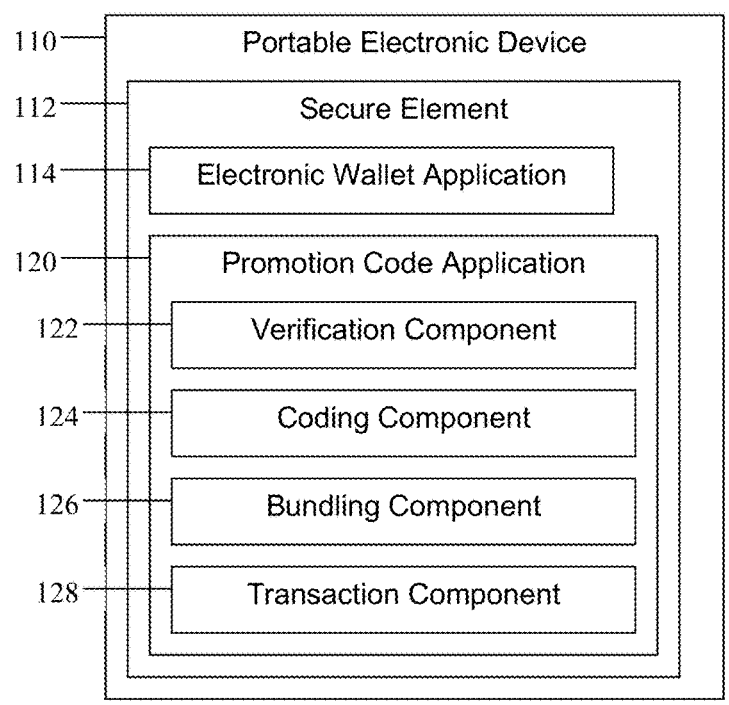

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

The present disclosure teaches the dynamic insertion of promotion codes into contactless payment transactions by a promotion code application executing on a portable electronic device. In an embodiment, the promotion code application applies criteria and qualifies the portable electronic device and/or its user to receive the benefits of at least one conditionally offered commercial promotion or coupon. The promotion code application may have received the conditional offer of the coupon from an offer platform representing a consumer goods manufacturer, for example. The offer platform may have conditionally offered the coupon contingent upon the portable electronic device and/or its user qualifying under a rule stipulated by the manufacturer. Assuming the portable electronic device and/or its user are qualified by the promotion code application under the rule, the promotion code application generates the code providing confirmation and sends the code to the offer platform or a redemption server. The promotion code application concurrently or subsequently transmits the same code along with payment details to a point of sale terminal while completing a contactless electronic transaction for goods or services associated with the coupon. The point of sale terminal then transmits the received code to the offer platform or redemption server that compares it with the code received from the portable electronic device. The validity of the code received from the point of sale terminal is confirmed, the point of sale terminal applies the discount or other benefit associated with the coupon to the sale, and the electronic transaction is completed.

The portable electronic device hosting the promotion code application may periodically receive rules from the offer platform describing qualifications for a plurality of promotional items. The rules may describe promotions and coupons and stipulate a single criterion or a plurality of criteria to be met by the portable electronic device and/or its user to qualify. Criteria may include stipulations regarding the physical location of the portable electronic device, the user's education level, or the user's credit rating, for example. The promotion code application may examine a stored profile containing information about the portable electronic device and the user. The promotion code application applies the criteria described in the rule to the profile and determines if the portable electronic device and user qualify to receive the benefits of the promotion or coupon.

The offer platform may work with communication services providers to assure the integrity of the installation and operation of the promotion code application on the portable electronic devices. The offer platform also may work with a plurality of manufacturers of consumer goods and vendors of other products and services. The offer platform may distribute commercial promotions and coupons offered by the manufacturers and vendors conditioned upon rules being met by recipients of the promotions and coupons. The offer platform may perform services at the time of electronic transaction to verify the validity of codes provided to point of sale terminals and may direct a retailer involved in the transaction to provide the discount or other benefit described in the coupon represented by the code.

The promotion code application may alternatively locate promotions or coupons from sources other than the offer platform, qualify the portable electronic device and/or its user for the located promotions or coupons, generate a code for the coupons singly or in bundled format, and send the code to the offer platform or redemption server. Electronic transactions for goods and services covered by the promotions or coupons then may be completed in the manner described above. The present disclosure teaches the promotion code application receiving a plurality or bundle of electronic coupons that may provide a qualifying user of the portable electronic device discounts and other benefits for consumer products and services. A consumer goods company or aggregator of marketing promotions may assemble a targeted collection of coupons that may be attractive to the user. Information aggregated about a plurality of users' tendering of these coupons in electronic transactions on days, at times, and at retail locations may be of value to manufacturers and retailers. The information may be useful in more accurately assembling and targeting future coupon bundles and in designing new promotional offerings involving electronic coupons and other benefits.

In an embodiment, the bundling of electronic coupons or other promotional offers and using a code to identify the bundle to a point of sale terminal may be deployed on its own, without combining with the functionality of the promotion code application on the portable electronic device autonomously generating coupons according to rules established by an offer platform or other marketing entity. The offer platform may associate a plurality of coupons or other promotional offers conceptually in a bundle which is identified by a code or other reference. The offer platform may pass this code or reference to one or more portable electronic devices for use in completing purchases at a point of sale terminal based on one or more of the coupons or other promotional offers associated with the bundle. The portable electronic device may store this code or reference in a secure element until it attempts to complete a purchase transaction based at least in part on redeeming one or more coupon or other promotional offer. The portable electronic device may transmit the code or reference to the point of sale terminal. The point of sale terminal may communicate with the offer platform to determine what coupons and/or other promotional offers the subject code refers to. The point of sale terminal may then analyze the coupons and/or other promotional offers associated together by the bundle and determine if an item being purchased is entitled to a discount.

The promotion code application may provide payment information and the promotion code in separate electronic fields similar to the way in which this information is provided in separate tracks in the magnetic strip affixed to a physical credit card during a transaction. Alternatively, the promotion code application may provide payment information and the promotion code to a point of sale terminal using known contactless communication methods, for example establishing a transaction session and conveying the payment information and promotion code in one or more message transmitted to the point of sale terminal during the transaction session. The promotion code application may permit this information to be provided in a single tap or physical pass of the portable electronic device near the point of sale terminal.

Turning now to FIG. 1, a system 100 of dynamic code insertion in contactless payments is provided. In an embodiment, the system 100 comprises a portable electronic device 110, a secure element 112, an electronic wallet application 114, a promotion code application 120, an offer platform 130, a point of sale terminal 140, a redemption server 150, a financial institution 160, a manufacturer 170, a database 172, a base transceiver system 180, and a network 190.

The portable electronic device 110 may be one of a mobile telephone, a personal digital assistant (PDA), a media player, and a gaming device. The portable electronic device 110 may host a plurality of applications that execute on the portable electronic device 110 including the electronic wallet application 114 and the promotion code application 120. While FIG. 1 depicts only one portable electronic device 110, it is understood that a plurality of portable electronic devices 110 may be operative in the system 100.

The promotion code application 120 executes on the portable electronic device 110 and electronically receives rules from the offer platform 130. The promotion code application 120 applies conditions described by the rules to the hosting portable electronic device 110. Upon determining that the portable electronic device 110 meets the conditions described by the rules, the promotion code application 120 may generate a code. When the portable electronic device 110 enters into a contactless electronic transaction with the point of sale terminal 140, the promotion code application 120 may place the code in a field of the payment message that may correspond to track two in the magnetic strip of a physical credit card. Alternatively, the promotion code application 120 may provide payment information and the promotion code to the point of sale terminal 140 using known contactless communication methods, for example establishing a transaction session and conveying the payment information and promotion code in one or more messages transmitted to the point of sale terminal 140 during the transaction session. The tendering of the code and its verification during the electronic transaction may entitle the portable electronic device 110 to a discount or other commercial benefit in the form of an electronic coupon or other medium. By qualifying under the rule and then entering into the electronic transaction, an electronic coupon may be created by the offer platform 130 and applied by the point of sale terminal 140 to the transaction.

Upon determining that the portable electronic device 110 qualifies under the rule, the promotion code application 120 also sends the code providing confirmation of qualification to the offer platform 130 or the redemption server 150 before or at the time of the electronic transaction. When electronically completing a transaction for a product, the promotion code application 120 separately may transmit the code and transmit the payment details in a manner similar to the tendering of this information from tracks two and one, respectively, of the magnetic strip of a credit card during transactions using this payment method. Payment messages generated by the electronic wallet application 114 and promotion code application 120 may comprise fields containing electronic objects and do not comprise tracks per se as used by physical credit and debit cards. The terms track one and track two may be used informally herein for discussion purposes to indicate the separation of the payment details and code, respectively, within the electronic stream of payment messages. Alternatively, the promotion code application 120 may provide payment information and the promotion code to the point of sale terminal 140 using known contactless communication methods, for example establishing a transaction session and conveying the payment information and promotion code in one or more messages transmitted to the point of sale terminal 140 during the transaction session.

The point of sale terminal 140 in an electronic transaction may recognize the code and payment details in the electronic stream in a manner similar to its recognition of this information read from a magnetic strip when a physical credit card is used. The point of sale terminal 140 communicates with the offer platform 130 or the redemption server 150 to obtain a coupon or discount based on the code received in the electronic transaction. If the offer platform 130 and/or the redemption server 150 returns a coupon or discount to the point of sale terminal 140, the point of sale terminal 140 applies a discount that may be associated with the electronic coupon, and the transaction is completed.

The promotion code application 120 may evaluate eligibility to use a coupon by applying a plurality of conditions described in rules to the portable electronic device 110 including examining user age, user educational level, user income level, user credit score, user marital status, user number of children, user residence type, user residential address, and user purchase history. Rules sent by the offer platform 130 also may include some processing logic to be used by the promotion code application 120 in making determinations. Profile information may be used by merchants to make decisions about directing commercial promotions to some portable electronic devices. The physical movement of the portable electronic devices may be monitored and their physical entry into retail establishments and other locations may trigger the activation of commercial promotions. The location of the portable electronic device 110 may be determined, and the rule may be applied based on the location. If the user of the portable electronic device 110 enters a retail establishment selling products associated with an electronic coupon provided earlier to the portable electronic device 110, the promotion code application 120 may detect this, validate the portable electronic device 110 to use the coupon, and send a code associated with the coupon to the offer platform 130 in anticipation of the user making a purchase.

In an embodiment, the code may be provided by the offer platform 130 with the rule, and the promotion code application 120 would not generate the code. If the portable electronic device 110 qualifies under the rule, the promotion code application 120 would send the code back to the offer platform 130 or to the redemption server 150 for retention until a contactless electronic transaction is begun at a point of sale terminal 140. The code would be compared to the code transmitted in the payment message and verification would take place as described.

The promotion code application 120, in addition to receiving rules from the offer platform 130 associated with promotions and coupons provided by vendors to the offer platform 130, may locate such promotions and coupons elsewhere. The promotion code application 120 may then qualify the portable electronic device 110 for the coupons, create a code, associate the code with the coupons, and send the code to the offer platform 130 or the redemption server 150. When the portable electronic device 110 later electronically completes a transaction at a point of sale terminal 140, it retransmits the same code with the payment details. As in the previous scenario, the point of sale terminal 140 communicates with the offer platform 130 or the redemption server 150 to obtain verification of the correct association of the code with a coupon for the goods or services involved in the transaction. The discount provided by the coupon is applied and the transaction is completed.

Whether the promotion code application 120 receives access to coupons in a rule from the offer platform 130 or locates coupons from other sources, the promotion code application 120 performs the same or similar steps of qualifying the eligibility of the portable electronic device 110 to use the coupons, generating and sending the code to the offer platform 130 or the redemption server 150, and transmitting the code again during a wireless electronic transaction. The offer platform 130 and the manufacturers 170 that provide promotional items and coupons trust the promotion code application 120 to qualify the portable electronic device 110 for eligibility to use the coupons and generate a code linkable to the coupon associated with the goods involved in the transaction. When applicable, they trust the promotion code application 120 to enforce the stipulations contained in the rules and disallow non-qualifying portable electronic devices 110. When the portable electronic device 110 completes a wireless, contactless transaction at the point of sale terminal 140, the payment transaction message transmitted by the portable electronic device 110 may comprise fields that may correspond to the tracks in a magnetic strip of a physical debit card, credit card, or other physical card used in a traditional retail transaction. The transaction message may comprise a first portion containing payment account information and a second portion containing the code generated by the promotion code application 120 for the coupon associated with the retail transaction being completed. When the portable electronic device 110 is brought physically proximate the point of sale terminal 140, the promotion code application 120 generates the payment transaction message containing the payment information and the code. The payment information and the code may be provided in separate fields of the payment transaction message similar to the manner in which this information may be provided in separate tracks in the magnetic strip affixed to a credit card during physical credit card transactions. The payment information and the code may be transmitted to the point of sale terminal 140 in a single "tap" or proximate pass by the portable electronic device 110 to the point of sale terminal 140 as may be known to those familiar to near field communications (NFC) technology.

The secure element 112 is located in the portable electronic device 110 and is a secure collection of hardware and software components that house the payment applications, personal data, and payment information of the user of the portable electronic device 110. The secure element 112 may contain public/private key pairs and encrypted software components used for authentication and to complete electronic transactions. The secure element 112 comprises the electronic wallet application 114 that may contain securely protected credit card information, debit card information, and other confidential personal and profile information about the user. The electronic wallet application 114 executes at least partially within the secure element 112 and passes the credit or debit card information and other confidential information to the point of sale terminal 140 using near field communication (NFC) technology to complete wireless transactions.

The offer platform 130 may be a trusted service manager and distributes rules to the portable electronic device 110 that describe eligibility for commercial promotions and coupons offered by the manufacturer 170 of the products associated with the promotions and coupons. The manufacturer 170 as described herein may be a producer, distributor, or other vendor of products and services. The manufacturer 170 may contract with the offer platform 130 for the offer platform 130 to distribute commercial promotions and coupons to a plurality of potential customers including the portable electronic device 110. The offer platform 130 or redemption server 150 receives codes from the promotion code application 120 that associate coupons codes. The offer platform 130 or redemption server 150, during the completion of an electronic transaction, replies to inquiries from the point of sale terminal 140 that promotion codes provided by point of sale terminal 140 match codes sent by the promotion code application 120 and are valid. The offer platform 130 or redemption server 150 advises the point of sale terminal 140 that it may proceed with applying the discount described in the coupon to the transaction.

While the promotion code application 120 executing on the portable electronic device 110 applies conditions and tests to confirm that the portable electronic device 110 and possibly its user qualify to use the coupon described by the rule received from the offer platform 130, it is the offer platform 130 or redemption server 150 that receives the code from the promotion code application 120 and matches it with the code sent subsequently or concurrently by the point of sale terminal 140 during a transaction. The offer platform 130 may be an entity independent of the manufacturer 170 or it may comprise functionality incorporated into the systems of the manufacturer 170. The offer platform 130 and the redemption server 150 may work with a plurality of manufacturers 170 in verifying eligibility for promotion and coupon redemption. The offer platform 130 also may provide a clearinghouse function on behalf of the manufacturer 170 by tracking codes associated with coupons during a sale from the point of sale terminal 140. The offer platform 130 may maintain records of coupons received from a plurality of portable electronic devices 110 and may provide transaction accounting services for manufacturers 170. The offer platform 130 may work with the redemption server 150 to track coupon redemption and calculate information for manufacturers 170 during and at the end of accounting periods regarding various coupon and promotion redemptions. The offer platform 130 may work with a financial institution 160 in assisting with remittances and other transaction details.

Information about how and when the various portable electronic devices 110 use specific coupons may be aggregated and used to develop information about user preferences and behaviors as well as perform data mining. When usage patterns are combined with information contained in user profiles and information about the physical movements of portable electronic devices 110, analysis may be performed and valuable business intelligence about consumer habits and behaviors may be developed. In addition to developing better intelligence about specific promotions and coupons to provide to portable electronic devices 110, manufacturers 170 and offer platforms 130 may work together to send additional software modules to supplement or upgrade the promotion code application 120. These supplements and upgrades may more precisely track user behavior and provide finer and more targeted feedback for future use by the manufacturers 170 and offer platforms 130.

The present disclosure may promote the insertion of codes in manners that may not require changes to existing payment protocol formats, date formats, and other data formats used in electronic transactions. The code generated by the promotion code application 120 is dynamically inserted or provisioned into existing available data fields during transactions by the electronic wallet application 114. The single individual code generated by the promotion code application 120 as taught herein may take advantage of the limited space available in fields of the electronic transmission sent by the electronic wallet application 114 to the point of sale terminal 140. The single code may be associated by the point of sale terminal 140 with one or a plurality of electronic coupons or other items of benefit in finalizing the electronic transaction.

The database 172 may be associated with the manufacturer 170 and/or the offer platform 130 and may store information about previous and existing commercial promotions and coupon offerings. The database 172 may store information about a plurality of portable electronic devices 110 and their users. The database 172 may store information about a plurality of retailers, distributors, and other vendors that may use point of sale terminals 140 in completing transactions with portable electronic devices 110.

The promotion code application 120 comprises the verification component 122 that receives rules from the offer platform 130. The verification component 122 processes the rules to determine whether the portable electronic device 110 is qualified to exercise a right associated with a commercial promotion or coupon described in a rule. A rule may offer a promotion or coupon but may stipulate that only certain portable electronic devices 110 and their associated or registered users or subscribers may be eligible for the coupon. The rule may stipulate that the portable electronic device 110 is situated at or near a specific geographic location to be eligible. The stipulated geographic location may be a city, state, or country, or an address in a city. The rule may instead stipulate the geographic location is within a radius of a location, for example within one mile or five miles of a retail establishment. The stipulated geographic location may be the retail establishment itself. For example, when the user of the portable electronic device 110 enters the retail establishment, electronic devices situated at the retail establishment may detect signaling generated by the portable electronic device 110 and establish the identity of the portable electronic device 110. This detection may trigger the retail establishment to alert the manufacturer 170 or alert the offer platform 130 directly to cause these components to send a rule to the portable electronic device 110 allowing the portable electronic device 110 to be considered for a coupon on a product sold at the retail establishment. Alternatively, a rule previously may have been sent to the portable electronic device 110, perhaps a day, a week, or more before the user visited the retail establishment. The promotion code application 120 may partially qualify the portable electronic device 110 under the rule for the coupon and store it for a predetermined time period. If during the time period the portable electronic device 110 is carried into the retail establishment, then the verification component 122 may complete the qualification under the rule and the coupon may become fully valid for use at the retail establishment. In an embodiment, the portable electronic device 110 may generate a tone or vibration to alert the user that a coupon has been provided for use in the retail establishment.

In addition to conditioning eligibility for promotions or coupons based on location under a rule received from the offer platform 130, the verification component 122 may apply other conditions that may be stipulated in a rule. The manufacturer 170 may target various known market segments for its products based on business intelligence it has developed about its customer base. The manufacturer 170 may direct a promotion to a known market segment that is defined by age group, residence location, and other demographic and socioeconomic information. A profile of the user of portable electronic device 110 may be stored on the portable electronic device 110 or may be stored elsewhere. The verification component 122 may consult the profile when applying conditions stipulated by the rule. The profile may contain such information as user age, user education level, user income level, user credit score, user marital status, user number of children, user residence type, user residential address, and user purchase history. The rule may stipulate any one of or various combinations of these points of data depending on the products and other incentives involved in the promotion.

The promotion code application 120 also comprises the coding component 124 that generates codes after rules received from the offer platform 130 have been applied to the portable electronic device 110 and qualified by the verification component 122. Codes are used by the promotion code application 120 to certify that the portable electronic device 110 and its user have met the stipulations of the rule and therefore qualify for the commercial promotion or coupon offered by the rule. Codes may contain fields that identify the rule, the portable electronic device 110 and its user, the date the code was created, and other information. The format of the code may be standardized for the components of the system 100 or across an industry of which the offer platform 130 is part. When the coding component 124 creates the code, it stores the code on the portable electronic device 110 or elsewhere for at least the life of the promotion or until the expiration date of the coupon. The code is stored such that it is accessible by the promotion code application 120 when the portable electronic device 110 enters into an electronic transaction for merchandise covered by the coupon and the code is to be passed to the point of sale terminal 140 to receive credit for the coupon. In an embodiment, the coding component 124 may not create the code. Instead, the offer platform 130 may send the code to the promotion code application 120 along with the rule. If the portable electronic device 110 qualifies under the rule, the coding component 124 may transmit the received code back to the offer platform 130 or to the redemption server to confirm qualification.

When the coding component 124 creates the code, in addition to storing the code, it may send a duplicate copy of the code to the offer platform 130 or the redemption server 150. The offer platform 130 or the redemption server 150 retains the code in anticipation of receiving the matching version of the code from the point of sale terminal 140 during the completion of a retail transaction. When contacted by the point of sale terminal 140 when the anticipated retail transaction is initiated, the offer platform 130 or the redemption server 150 compares the code it received earlier from the coding component 124 with the code presented by the point of sale terminal 140. When the offer platform 130 determines that the codes match and the promotions or coupons associated with the codes are still valid, the offer platform 130 advises the point of sale terminal 140 that it may proceed with applying the discount. The code may contain an expiration date such that it automatically deletes itself from the storage of both the portable electronic device 110 and the offer platform 130 when the expiration date is reached. The offer platform 130 or the redemption server 150 may retain its copy of the code and match it with the code received from the point of sale terminal 140. When the transaction is complete, the code may be used by the offer platform 130 in working with the redemption server 150 in reporting the redemption of the coupon to the manufacturer 170 and in post-transaction accounting tasks.

The promotion code application 120 also comprises the bundling component 126. The present disclosure teaches the promotion code application 120 receiving rules from the offer platform 130 associated with commercial promotions and coupons. The promotion code application 120 applies stipulations contained in the rules to determine if the portable electronic device 110 is qualified to exercise rights associated with the commercial promotions and coupons associated with the rules. In an embodiment, the promotion code application 120, instead of receiving a rule from the offer platform 130, may locate commercial promotions and coupons from other sources possibly unrelated and unknown to the offer platform 130. In an embodiment, a plurality of offer platforms 130 may exist that may comprise such other sources of commercial promotions and coupons. The plurality of offer platforms 130, including the offer platform 130 described in detail herein, may be associated with each other in industry groups and associations and follow common practices. The commercial promotions and coupons from such other sources may provide stipulations similar to those provided by the rules received from the offer platform 130. The verification component 122 of the promotion code application 120 may apply the stipulations of these promotions and coupons from the other sources. When the verification component 122 determines that the portable electronic device 110 is qualified to use these promotions and coupons, coding component 124 may generate a code for the promotions and coupons. The bundling component 126 then may gather or bundle these items for which the portable electronic device 110 has been qualified to use. The bundling component 126 bundles information about the items together and sends the code generated for the bundle to the offer platform 130. The offer platform 130 has the capability to recognize codes associated with a single or bundled group of promotions or coupons that did not originate from the offer platform 130 or arising from a rule sent by the offer platform 130.

Provided the code sent by the bundling component 126 correctly identifies the promotions or coupons associated with the code, the offer platform 130 may honor the code even though the offer platform 130 did not send a rule that resulted in the code being generated. In an embodiment, a plurality of offer platforms 130 and manufacturers 170, as noted, may observe common practices in one or more industry associations such that codes are structured in a generally accepted format. The common practices may extend to how codes are handled and verified in transactions completed at a plurality of point of sale terminals 140. While the offer platform 130 may send rules and process codes associated with goods and services produced by manufacturers 170 with which it has business relationships, the offer platform 130 may also in the regular course of its business accept and process codes not associated with rules it originated.

The promotion code application 120 also comprises the transaction component 128 that activates when a contactless transaction is to be completed at a point of sale terminal 140 by the portable electronic device 110. When the portable electronic device 110 begins an electronic, contactless transaction, the electronic wallet application 114 may be executed to generate payment information to send to the point of sale terminal 140. This information may be placed in a first portion of a payment transaction message that may correspond to the track one of a magnetic strip of a credit card. The transaction component 128 may place the promotion code for the transaction in a second portion of the payment transaction message that may correspond to a track tw of a magnetic strip of a credit card. The information in the first portion and the second portion may be sent in a single transmission activated by a single tap or proximate electronic contactless communication by the portable electronic device 110 with the point of sale terminal 140. The payment account information may be one of credit card information and debit card information. The point of sale terminal 140 redeems coupons associated with the promotion code received in the payment transaction message. Promotion information, including the amount of discount to apply to a transaction, is retrieved from the offer platform 130 after the point of sale terminal 140 provides the code received from the transaction component 128 to the offer platform 130. The offer platform 130 compares the code to the code it or the redemption server 150 received earlier from the coding component 124 and notifies the point of sale terminal 140 that it may apply the discount in the coupon associated with the code. As the transaction is completing, the point of sale terminal 140 charges the payment account identified by the payment account information.

The portable electronic device 110 additionally may comprise a first radio transceiver and a second radio transceiver. The first radio transceiver communicates based on one of a code division multiple access (CDMA) technology, a global system for mobile communications (GSM) technology, a long-term evolution (LTE) technology, and a worldwide interoperability for microwave access (WiMAX) technology. The portable electronic device 110 may use the first radio transceiver to communicate with the offer platform 130. The portable electronic device 110 may use the second radio transceiver to transmit payment transaction messages to the point of sale terminal 140.

The base transceiver station 180 may be any of a cellular wireless base station, for example a Code Division Multiple Access (CDMA), Global System for Mobile Communications (GSM), Universal Mobile Communications System (UMTS), and/or Long-term Evolution (LTE) cellular wireless base station; a Worldwide Interoperability for Microwave Access (WiMAX) base station; a WiFi access point; a femtocell; or other wireless access devices. While FIG. 1 depicts only one base transceiver station 180, in an embodiment a plurality of base transceiver stations 180 may be existent and in operation.

The network 190 promotes communication between the components of the system 100. The network 190 may be any communication network including a public data network (PDN), a public switched telephone network (PSTN), a private network, and/or a combination thereof.

Figure 2:
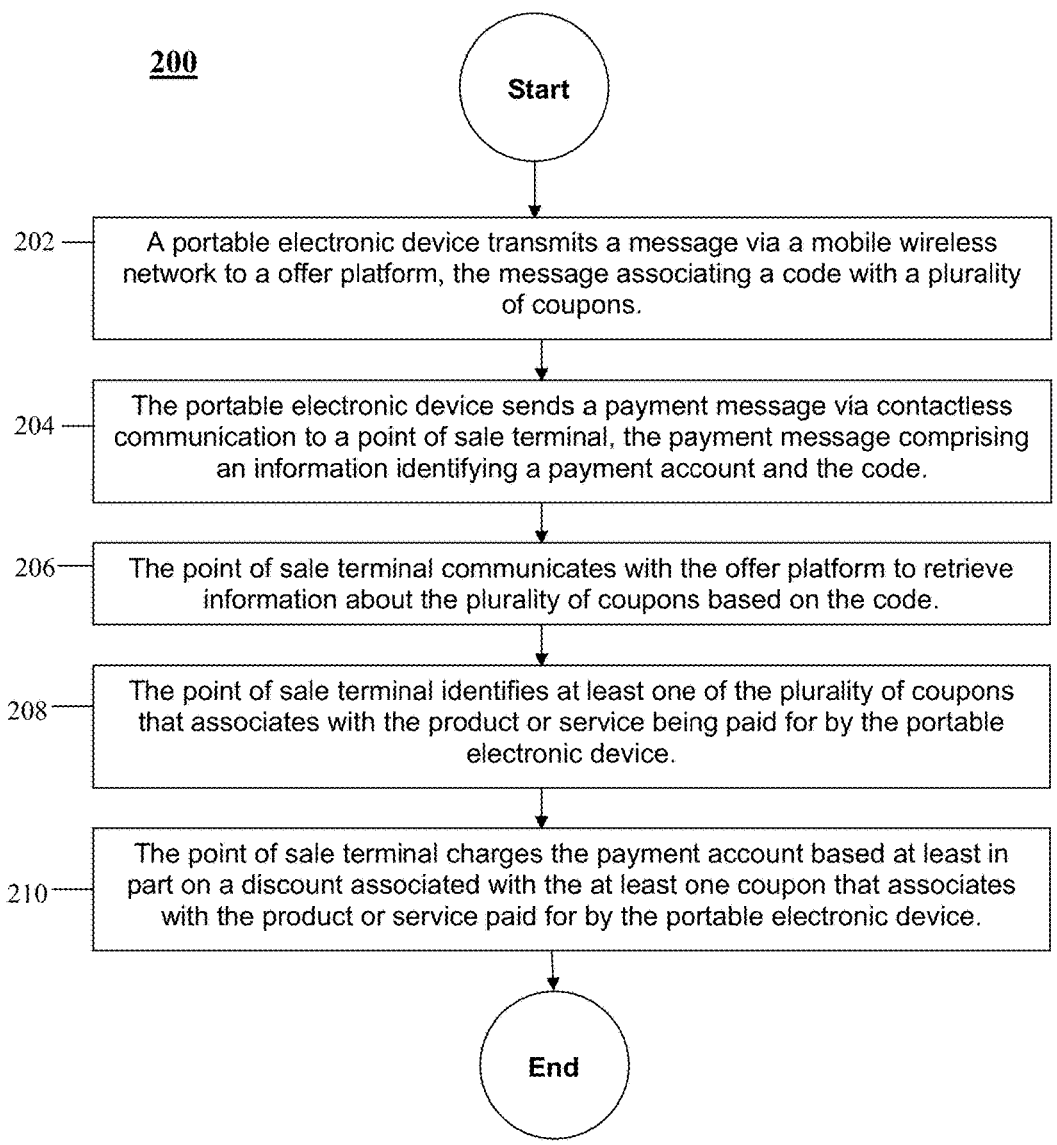
FIG. 2 is a flow chart illustrating a method according to an embodiment of the disclosure.

Turning now to FIG. 2, a method 200 of completing a contactless payment transaction is described. Beginning at block 202, the portable electronic device 110 transmits a message via a mobile wireless network to an offer platform 130, the message associating a code with a plurality of coupons.

At block 204, the portable electronic device 110 sends a payment message via contactless communication to a point of sale terminal 140, the payment message comprising information identifying a payment account and the code. At block 206, the point of sale terminal 140 communicates with the offer platform 130 to retrieve information about the plurality of coupons based on the code.

At block 208, the point of sale terminal 140 identifies at least one of the plurality of coupons that associates with the product or service being paid for by the portable electronic device 110. At block 210, the point of sale terminal 140 charges the payment account based at least in part on a discount associated with the at least one coupon that associates with the product or service paid for by the portable electronic device 110.

Figure 3:
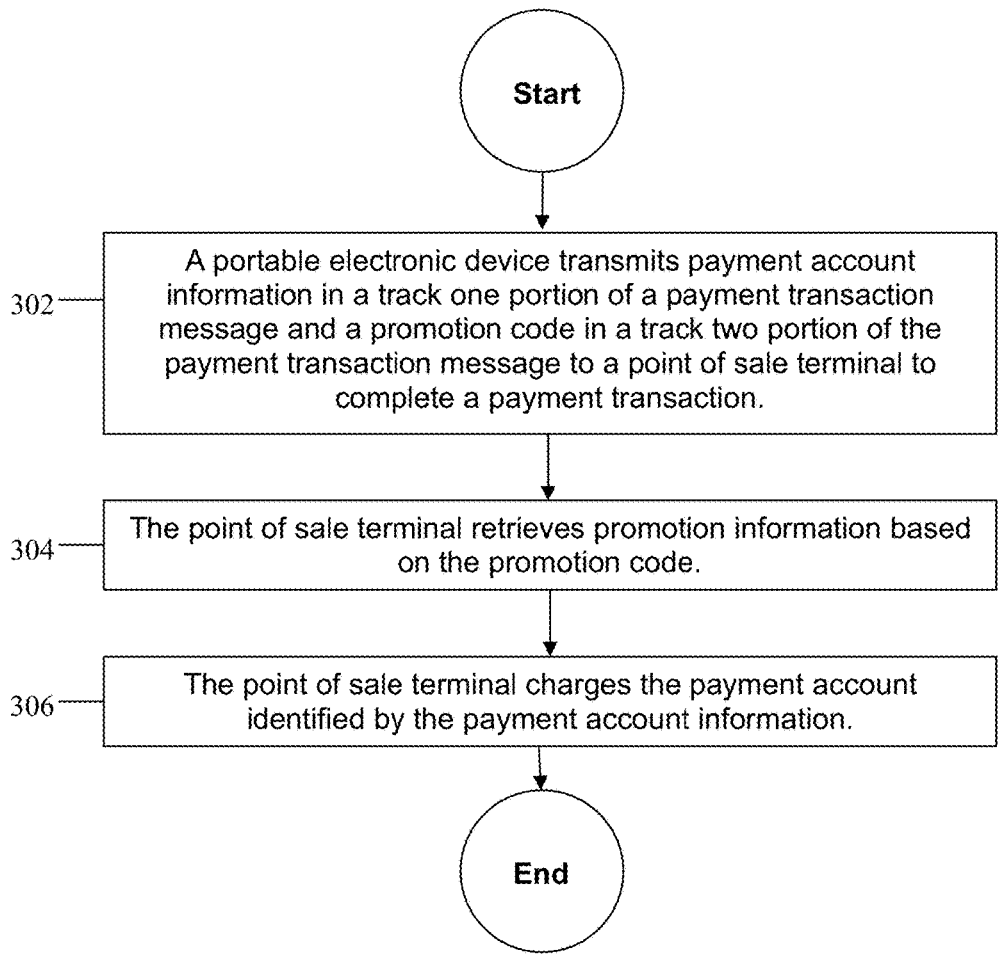
FIG. 3 is a flow chart illustrating a method according to an embodiment of the disclosure.

Turning now to FIG. 3, a method 300 of completing a contactless payment transaction is described. Beginning at block 302, the portable electronic device 110 may transmit payment account information in a track one portion of a payment transaction message and a promotion code in a track two portion of the payment transaction message to the point of sale terminal 140 to complete a payment transaction. The track one and track two portions of the payment transaction message may correspond to the first and second portions, respectively, described elsewhere herein. Alternatively, the portable electronic device 110 may provide payment information and the promotion code to the point of sale terminal 140 using known contactless communication methods, for example establishing a transaction session and conveying the payment account information and promotion code in one or more message transmitted to the point of sale terminal 140 during the transaction session.

At block 304, the point of sale terminal 140 retrieves promotion information based on the promotion code. At block 306, the point of sale terminal 140 charges the payment account identified by the payment account information.

Figure 4:
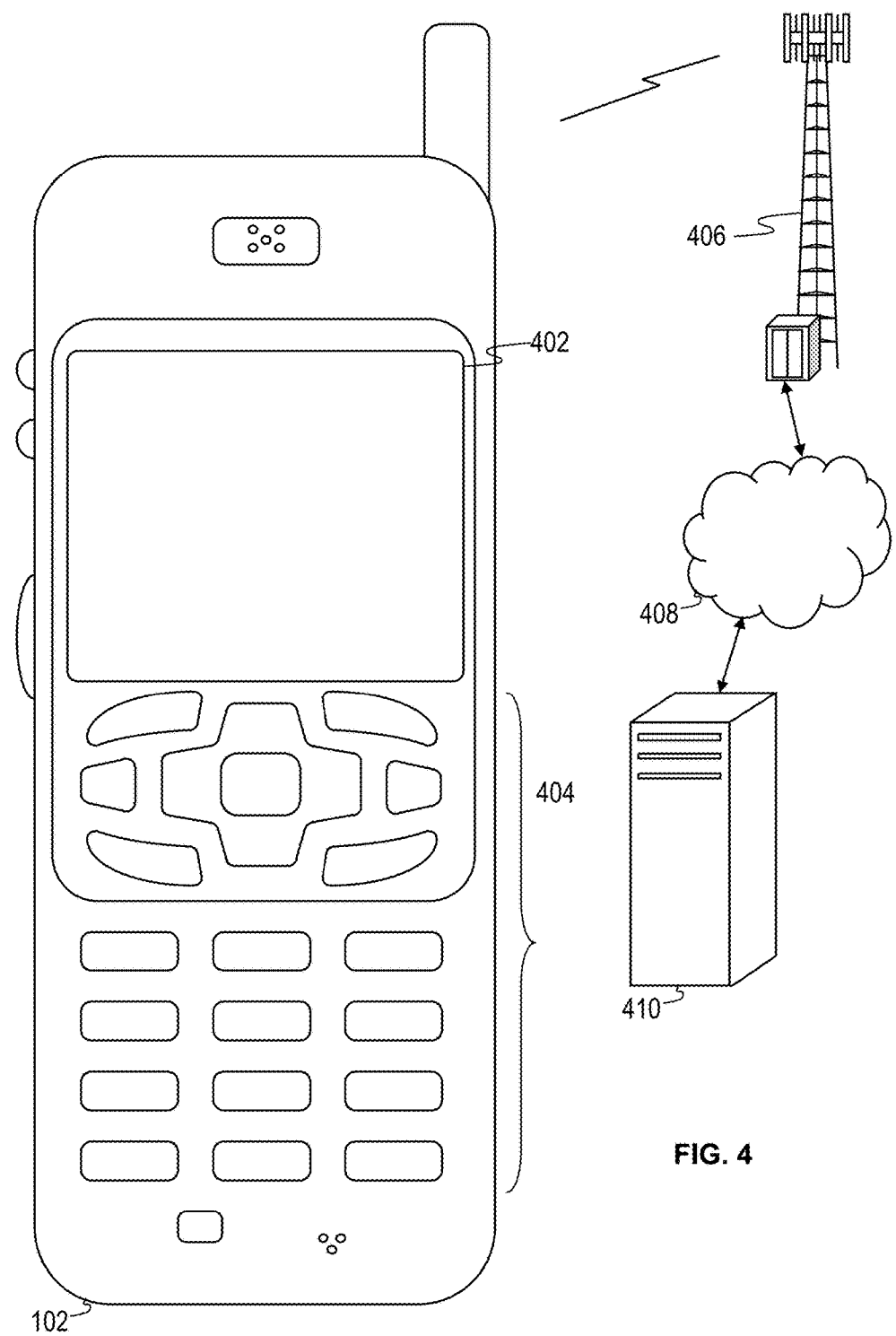
FIG. 4 is an illustration of a mobile device according to an embodiment of the disclosure.

FIG. 4 shows a wireless communications system including a mobile device 102. FIG. 4 depicts the mobile device 102, which is operable for implementing aspects of the present disclosure, but the present disclosure should not be limited to these implementations. The mobile device 102 may in some embodiments exemplify the portable electronic device 110 described in the system 100. Though illustrated as a mobile phone, the mobile device 102 may take various forms including a wireless handset, a pager, a personal digital assistant (PDA), a gaming device, an inventory control device, a media player, a digital camera, a digital calculator, a portable computer, a tablet computer, a laptop computer, and/or other. Many suitable handsets combine some or all of these functions. In some embodiments of the present disclosure, the mobile device 102 is not a general purpose computing device like a portable, laptop or tablet computer, but rather is a special-purpose communications device such as a mobile phone, wireless handset, pager, or PDA. The mobile device 102 may support specialized activities such as gaming, inventory control, job control, and/or task management functions, and so on.

The mobile device 102 includes a display 402 and a touch-sensitive surface and/or keys 404 for input by a user. The mobile device 102 may present options for the user to select, controls for the user to actuate, and/or cursors or other indicators for the user to direct. The mobile device 102 may further accept data entry from the user, including numbers to dial or various parameter values for configuring the operation of the handset. The mobile device 102 may further execute one or more software or firmware applications in response to user commands. These applications may configure the mobile device 102 to perform various customized functions in response to user interaction. Additionally, the mobile device 102 may be programmed and/or configured over-the-air, for example from a wireless base station, a wireless access point, or a peer mobile device 102.

The mobile device 102 may execute a web browser application which enables the display 402 to show a web page. The web page may be obtained via wireless communications with a base transceiver station (BTS) 406, a wireless network access node, a peer mobile device 102 or any other wireless communication network or system. While a single base transceiver station 406 is illustrated, it is understood that the wireless communication system may comprise additional base transceiver stations. In some instances, the mobile device 102 may be in communication with multiple base transceiver stations 406 at the same time. The base transceiver station 406 (or wireless network access node) is coupled to a wired network 408, such as the Internet. Via the wireless link and the wired network, the mobile device 102 has access to information on various servers, such as a server 410. The server 410 may provide content that may be shown on the display 402. Alternately, the mobile device 102 may access the base transceiver station 406 through a peer mobile device 102 acting as an intermediary, in a relay type or hop type of connection.

Figure 5:
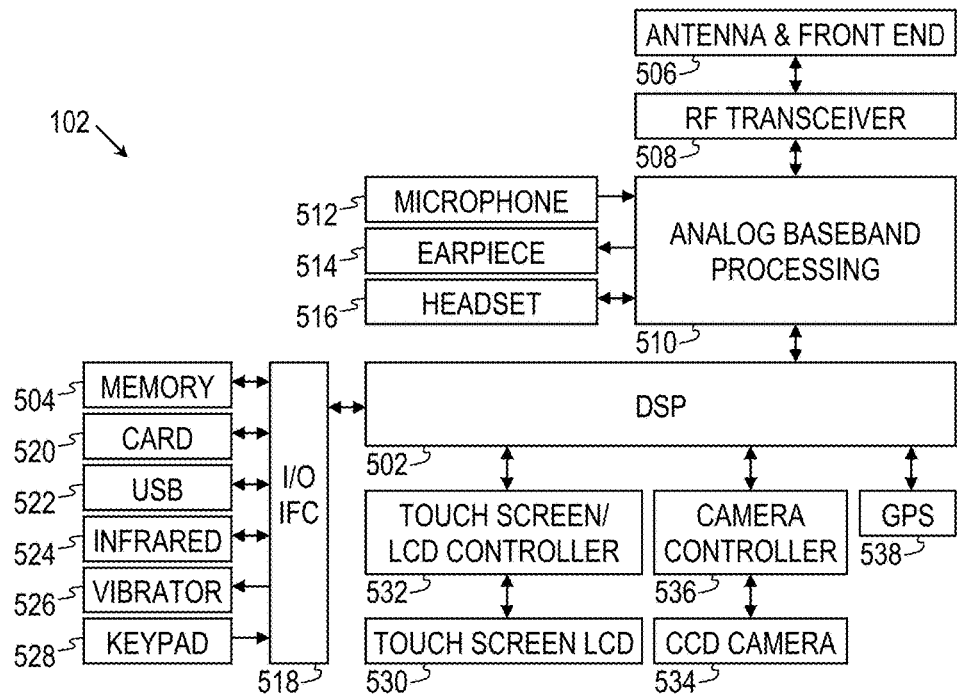
FIG. 5 is a block diagram of a mobile device according to an embodiment of the disclosure.

FIG. 5 shows a block diagram of the mobile device 102. While a variety of known components of handsets 102 are depicted, in an embodiment a subset of the listed components and/or additional components not listed may be included in the mobile device 102. The mobile device 102 includes a digital signal processor (DSP) 502 and a memory 504. As shown, the mobile device 102 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile device 102 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the mobile device 102 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 102 to send and receive information from a radio access network (RAN) or some other available wireless communications network or from a peer mobile device 102. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 408, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the mobile device 102 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 102 to function as a peripheral device to exchange information with a personal computer or other computer system. The infrared port 524 and other optional ports such as a Bluetooth interface or an IEEE 802.11 compliant wireless interface may enable the mobile device 102 to communicate wirelessly with other nearby handsets and/or wireless base stations.

The input/output interface 518 may further connect the DSP 502 to the vibrator 526 that, when triggered, causes the mobile device 102 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the mobile device 102. Another input mechanism may be the touch screen LCD 530, which may also display text and/or graphics to the user. The touch screen LCD controller 532 couples the DSP 502 to the touch screen LCD 530.

The CCD camera 534 enables the mobile device 102 to take digital pictures. The DSP 502 communicates with the CCD camera 534 via the camera controller 536. The GPS sensor 538 is coupled to the DSP 502 to decode global positioning system signals, thereby enabling the mobile device 102 to determine its position. In another embodiment, a camera operating according to a technology other than charge coupled device cameras may be employed. Various other peripherals may also be included to provide additional functions, e.g., radio and television reception.

Figure 6:
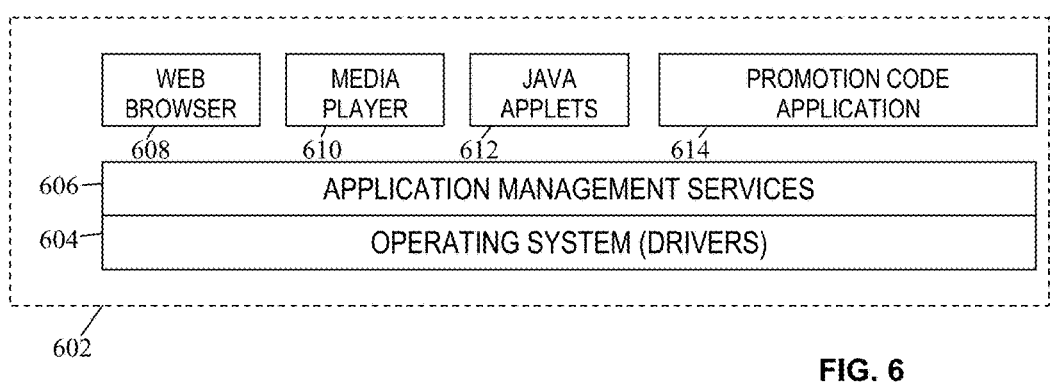
FIG. 6 is a block diagram of a software architecture for a mobile device according to an embodiment of the disclosure.

FIG. 6 illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services ("AMS") 606 that transfer control between applications running on the mobile device 102. Also shown in FIG. 6 are a web browser application 608, a media player application 610, and JAVA applets 612. The web browser application 608 configures the mobile device 102 to operate as a web browser, allowing a user to enter information into forms and select links to retrieve and view web pages. The media player application 610 configures the mobile device 102 to retrieve and play audio or audiovisual media. The JAVA applets 612 configure the mobile device 102 to provide games, utilities, and other functionality. The promotion code application 614 may correspond to the promotion code application 120 described by the system 100.

Figure 7:
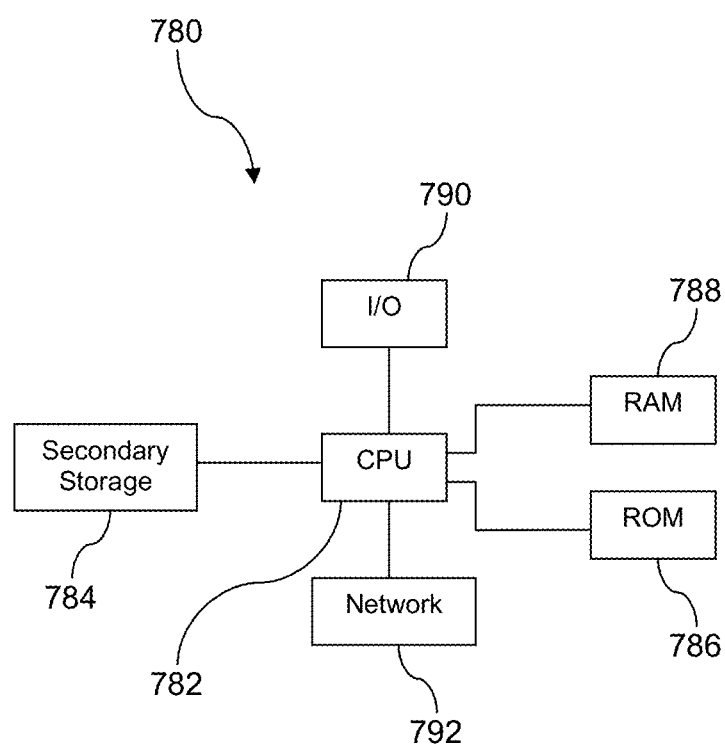
FIG. 7 illustrates an exemplary computer system suitable for implementing some aspects of the several embodiments of the disclosure.

FIG. 7 illustrates a computer system 780 suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

It is understood that by programming and/or loading executable instructions onto the computer system 780, at least one of the CPU 782, the RAM 788, and the ROM 786 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (Wi-MAX), and/or other air interface protocol radio transceiver cards, and other well-known network devices. These network connectivity devices 792 may enable the processor 782 to communicate with an Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors.

In an embodiment, the computer system 780 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 780 to provide the functionality of a number of servers that is not directly bound to the number of computers in the computer system 780. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 780, at least portions of the contents of the computer program product to the secondary storage 784, to the ROM 786, to the RAM 788, and/or to other non-volatile memory and volatile memory of the computer system 780. The processor 782 may process the executable instructions and/or data in part by directly accessing the computer program product, for example by reading from a CD-ROM disk inserted into a disk drive peripheral of the computer system 780. The computer program product may comprise instructions that promote the loading and/or copying of data, data structures, files, and/or executable instructions to the secondary storage 784, to the ROM 786, to the RAM 788, and/or to other non-volatile memory and volatile memory of the computer system 780.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A portable electronic device, comprising:
    a processor;
    a memory;
    a first radio transceiver;
    a second radio transceiver; and
    an application stored in the memory that, when executed by the processor,
        receives, at the portable electronic device, a rule associated with a commercial promotion via the first radio transceiver from an offer platform,
        determines, on the portable electronic device and based on the rule received from the offer server and information specific to the portable electronic device, that the portable electronic device is qualified to exercise a right associated with the commercial promotion,
        generates, on the portable electronic device in response to the portable electronic device being qualified to exercise the right associated with the commercial promotion, a code representing the commercial promotion, wherein the code indicates to the offer platform or a redemption server that the application has determined that the portable electronic device is qualified to exercise the right associated with the commercial promotion based on the rule received from the offer platform and indicates to a point of sale terminal that the portable electronic device qualifies for the commercial promotion,
        transmits, by the portable electronic device to the offer platform or the redemption server via the first radio transceiver, a message indicating that the portable electronic device has qualified to exercise the right associated with the commercial promotion according to the rule received from the offer platform and including the code representing the commercial promotion, and
        initiates a payment transaction associated with the commercial promotion by transmitting, by the portable electronic device, a payment transaction message comprising information identifying a payment source and the code representing the commercial promotion to a point of sale terminal.

2. The portable electronic device of claim 1, wherein the first radio transceiver communicates based on one of a code division multiple access (CDMA) technology, a global system for mobile communications (GSM) technology, a long-term evolution (LTE) technology, and a worldwide interoperability for microwave access (WIMAX) technology.

3. The portable electronic device of claim 1, wherein the payment transaction comprises the second radio transceiver transmitting the payment transaction message, and wherein the payment transaction message further comprises a track one comprising payment account information and a track two comprising the code.

4. The portable electronic device of claim 1, wherein the application determines that the portable electronic device is qualified to exercise the right associated with the commercial promotion based at least in part on a location of the portable electronic device.

5. The portable electronic device of claim 1, wherein the application determines that the portable electronic device is qualified to exercise the right associated with the commercial promotion based at least in part on a user profile associated with the portable electronic device.

6. The portable electronic device of claim 1, wherein the application further:
    receives a second rule associated with a second commercial promotion via the first radio transceiver,
    determines, based on the second rule and information specific to the portable electronic device, that the portable electronic device is not qualified to exercise a right associated with the second commercial promotion.

7. The portable electronic device of claim 1, wherein the portable electronic device is one of a mobile phone, a personal digital assistant (PDA), a media player, and a gaming device.

8. The portable electronic device of claim 5, wherein the user profile comprises information comprising at least one of user age, user educational level, user income level, user credit score, user marital status, user number of children, user residence type, user residential address, and user purchase history.

9. The portable electronic device of claim 1, wherein the rule is received from the offer platform and stipulates at least one criterion to be met by the portable electronic device to qualify to exercise the right associated with the commercial promotion.

10. The portable electronic device of claim 1, wherein in response to receiving the code from the application, the point of sale terminal transmits the code received from the application to the offer platform or the redemption server.

11. The portable electronic device of claim 10, wherein the offer platform or the redemption server compares the code received from the application and the code received from the point of sale terminal.

12. The portable electronic device of claim 11, wherein the point of sale terminal communicates with the offer platform or the redemption server to receive information about the commercial promotion represented by the code in response to a determination that the code received from the application matches the code received from the point of sale terminal.

13. The portable electronic device of claim 3, wherein the track one portion of the payment transaction message corresponds with a track one portion of a magnetic strip of a credit card and the track two portion of the payment transaction message corresponds with a track two portion of the magnetic strip of a credit card.

14. The portable electronic device of claim 1, wherein the code comprises fields that identify one or more rules, the portable electronic device and its user, and a date the code was created.

15. The portable electronic device of claim 1, wherein the payment transaction is completed using a single tap or contactless communication.

16. The portable electronic device of claim 1, wherein the rule is associated with a plurality of commercial promotions including the commercial promotion.

17. The portable electronic device of claim 16, wherein the code is associated with at least some of the plurality of commercial promotions.

18. The portable electronic device of claim 6, wherein the second rule is received from the offer platform.

* * * * *